(12) United States Patent
Liu

(10) Patent No.: US 11,734,014 B2
(45) Date of Patent: Aug. 22, 2023

(54) DEVICE AND PROCESSOR FOR IMPLEMENTING RESOURCE INDEX REPLACEMENT

(71) Applicant: C-SKY Microsystems Co., Ltd., Zhejiang (CN)

(72) Inventor: Chang Liu, Hangzhou (CN)

(73) Assignee: C-SKY Microsystems Co., Ltd., Zhejiang (CN)

( * ) Notice: Subject to any disclaimer, the term of this patent is extended or adjusted under 35 U.S.C. 154(b) by 0 days.

(21) Appl. No.: 17/660,565

(22) Filed: Apr. 25, 2022

(65) Prior Publication Data

US 2022/0244963 A1 Aug. 4, 2022

Related U.S. Application Data

(63) Continuation of application No. 16/488,435, filed as application No. PCT/CN2019/082422 on Apr. 12, 2019, now Pat. No. 11,340,905.

(30) Foreign Application Priority Data

Apr. 13, 2018 (CN) .......................... 201810331737.x

(51) Int. Cl.
*G06F 9/38* (2018.01)
*G06F 9/48* (2006.01)
*G06F 9/50* (2006.01)

(52) U.S. Cl.
CPC .............. *G06F 9/3836* (2013.01); *G06F 9/38* (2013.01); *G06F 9/384* (2013.01); *G06F 9/4881* (2013.01); *G06F 9/50* (2013.01); *G06F 9/5038* (2013.01)

(58) Field of Classification Search
None
See application file for complete search history.

(56) References Cited

U.S. PATENT DOCUMENTS 9,652,246 B1 5/2017 Tam et al.
2005/0138334 A1 6/2005 Sodani et al.

FOREIGN PATENT DOCUMENTS

CN 1650258 A 8/2005
CN 102422262 A 4/2012
(Continued)

OTHER PUBLICATIONS

PCT International Search Report and Written Opinion dated Jul. 12, 2019, issued in corresponding International Application No. PCT/CN2019/082422 (9 pgs.).

(Continued)

*Primary Examiner* — Qing Yuan Wu
(74) *Attorney, Agent, or Firm* — Finnegan, Henderson, Farabow & Garrett & Dunner LLP

(57) ABSTRACT

Embodiments of the present disclosure provides a device for implementing resource index replacement, comprising an instruction scheduling unit configured to receive a first type, resource index from a resource allocating unit and then issue an instruction to an instruction executing unit for execution, to receive a second type resource index from the resource allocating unit, to execute the instruction from the instruction scheduling unit, and to issue a result of the instruction execution and the second type resource index to a result storing unit. The result storing unit comprises a plurality of resource for storing instruction execution results and execution results. The result storing unit is configured to allocate the first type resource index to an instruction entering the instruction scheduling unit and to allocate the second type resource index to an instruction entering the instruction execution unit. The present disclosure also provides a processor comprising the above device for implementing resource index replacement. In addition, the present disclosure provides a method for implementing resource index replacement.

18 Claims, 6 Drawing Sheets

(56) References Cited

FOREIGN PATENT DOCUMENTS

| CN | 102495724 A | 6/2012 |
|---|---|---|
| CN | 103514009 A | 1/2014 |
| CN | 104216681 A | 12/2014 |
| CN | 103577159 A | 1/2016 |
| CN | 105242905 A | 1/2016 |
| CN | 105786498 A | 7/2016 |
| CN | 108614736 A | 10/2018 |
| WO | WO 2019/196927 A1 | 10/2019 |

OTHER PUBLICATIONS

European Patent Office Communication issued for Application No. 19786104.0 which encloses the extended European Search Report which includes pursuant to Rule 62 EPC, the Supplementary European Search Report (Art. 153(7) EPC) and the European search opinion, dated Apr. 15, 2021, 10 pages.

Monreal et al., "Delaying Physical Register Allocation Through Virtual-Physical Registers," Proceedings of the $32^{nd}$ Annual ACM/IEEE International Symposium on Microarchitecture, Haifa Israel, pp. 186-192 (1999).

First Chinese Search Report issued in corresponding Chinese Application No. 201810331737.X dated Jun. 21, 2020 (2 pages).

Gonzalez et al., "Virtual-physical registers," IEEE, 1998.

Wang et al., "Register renaming and scheduling for dynamic execution of predicated code," IEEE, pp. 15-20, 2001.

91 — | subi | r1, | r1, | 0x1 |

92 — | addi | r3, | r1, | 0x4 |
                  —61   —62

92 — | addi | T7, | T3, | 0x4 |
                  —71   —72

92 — | addi | P0, | P6, | 0x4 |
                  —81   —82

FIG. 2

DEVICE AND PROCESSOR FOR IMPLEMENTING RESOURCE INDEX REPLACEMENT

CROSS REFERENCE TO RELATED APPLICATION

The present application is a continuation of Ser. No. 16/488,435 filed Aug. 23, 2019, which is a national stage filing under 35 U.S.C. § 371 of International Application No. PCT/CN2019/082422, filed on Apr. 12, 2019, which claims the benefits of priority to Chinese application number 201810331737.x filed Apr. 13, 2018, all of which are incorporated herein by reference in their entireties.

BACKGROUND

The amount of resources used for storing execution results and execution scheduling has become a critical factor that impacts the cost of processors. To improve efficiency of speculative executions, a processor needs to rename a general-purpose register of instructions as a physical register index or other resource indexes having similar functions while the processor is performing scheduling, transmission, execution, and writeback, so as to eliminate spurious correlation among the instructions. This renaming process is referred to as register renaming.

SUMMARY OF THE DISCLOSURE

The present disclosure provides a device for implementing resource index replacement, comprising an instruction scheduling unit configured to receive a first type resource index from a resource allocating unit and then issue an instruction to an instruction executing unit for execution, to receive a second type resource index from the resource allocating unit, to execute the instruction from the instruction scheduling unit, and to issue a result of the instruction execution and the second type resource index to a result storing unit. The result storing unit comprises a plurality of resource for storing instruction execution results and execution results. The result storing unit is configured to allocate the first type resource index to an instruction entering the instruction scheduling unit and to allocate the second type resource index to an instruction entering the instruction execution unit. The present disclosure also provides a processor comprising the above device for implementing resource index replacement. In addition, the present disclosure provides a method for implementing resource index replacement.

BRIEF DESCRIPTION OF THE DRAWINGS

FIG. 2 is a schematic diagram of an exemplary instruction composition and resource index, according to some embodiments of the present disclosure.

DETAILED DESCRIPTION

To make the objectives, technical solutions, and advantages of embodiments of the present disclosure clearer, the technical solutions in the embodiments of the present disclosure are described below clearly and completely with reference to the accompanying drawings in the embodiments of the present disclosure. Obviously, the described embodiments are merely some, rather than all, of the embodiments of the present disclosure. Based on the embodiments of the present disclosure, all other embodiments obtainable by a person skilled in the art without creative efforts should fall within the protective scope of the present disclosure.

When processors execute instructions, successive instructions may not have any real data dependencies between them (e.g., write after read (WAR) and write after write (WAW)). Register renaming is a technique that eliminates these false data dependencies and that achieves better processor performance by allowing superscalar, speculative, or out-of-order execution of instructions. Generally, the amount of resources available for renaming determines the number of processors capable of speculative execution. More resources dedicated to renaming lead to speculative execution of more instructions by the processors, which in turn leads to higher processor performance. A large quantity of resources dedicated to renaming, however, increases the area and timing cost of the processors, thereby causing the overall processor cost to rise.

Conventional systems suffer the following flaws: a resource is often allocated too early, e.g., when entering an instruction scheduling unit. However, only when an instruction is executed in an executing unit does a processor need to allocate a resource for storing results. Allocating a resource too early leads to a waste of resources and the resource utilization efficiency is reduced.

Figure 1:
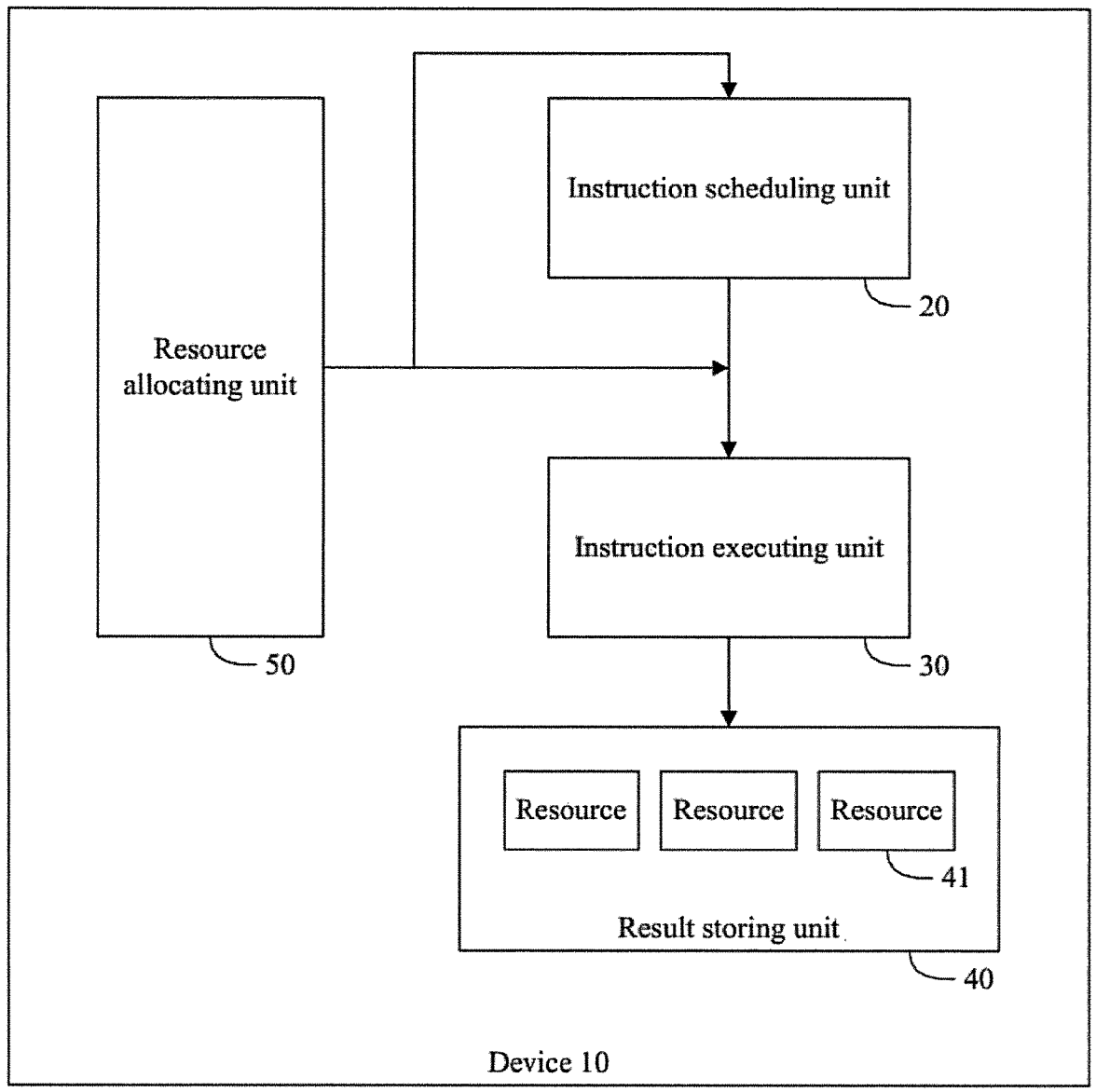
FIG. 1 is a schematic diagram of an exemplary device for implementing resource index replacement, according to some embodiments of the present disclosure.

The present disclosure overcomes these issues by providing a device for implementing resource index replacement. FIG. 1 is a schematic diagram of an exemplary device for implementing resource index replacement, according to some embodiments of the present disclosure. As shown in FIG. 1, device 10 comprises an instruction scheduling unit 20, an instruction executing unit 30, a result storing unit 40, and a resource allocating unit 50.

Instruction scheduling unit 20 includes circuitry configured to receive a first type resource index from resource allocating unit 50 and to store the index and a corresponding instruction for later transmission to an instruction executing unit 30.

Instruction executing unit 30 includes circuitry configured to receive a second type resource index from resource allocating unit 50, to receive the instruction from the instruction scheduling unit 20, to execute the instruction, and to issue an execution result of the instruction execution and the second type resource index to result storing unit 40.

Result storing unit 40 comprises a plurality of resources 41 for storing instruction execution results. Result storing unit 40 includes circuitry configured to receive execution results from instruction executing unit 30 and store the execution results in resources 41. Resources 41 are configured to be designated by the second type resource index.

Resource allocating unit 50 includes circuitry configured to allocate the first type resource index to an instruction and issue the instruction to instruction scheduling unit 20 and to allocate the second type resource index to an instruction and issue the instruction to instruction executing unit 30.

While device 10 is conducting instruction transmission and execution, resource allocating unit 50 allocates the first type resource index when an instruction enters instruction scheduling unit 20, and replaces the first type resource index with the second type resource index when the instruction is issued by instruction scheduling unit 20 to instruction executing unit 30.

In some embodiments, the resource allocated by resource allocating unit 50 to an instruction when the instruction enters instruction scheduling unit 20 does not correspond to resources 41 of result storing unit 40. The second type resource index used to replace the first type resource index by resource allocating unit 50 when the instruction is issued by instruction scheduling unit 20 to instruction executing unit 30 corresponds to resources 41 of result storing unit 40.

In some embodiments, the instruction comprises at least one of a source operand index or a target operand index. Resource allocating unit 50 implements the allocation of the first type resource index by replacing the target operand index with the first type resource index.

In some embodiments, the source operand index of the instruction corresponds to a target operand index of a second instruction, and resource allocating unit 50 replaces the source operand index of the instruction with the first type resource index of the second instruction. When the first type resource index of the second instruction is replaced by the second type resource index, the first type resource index of the instruction is simultaneously replaced by the second type resource index.

In some embodiments, the instruction can be issued by instruction scheduling unit 20 to instruction executing unit 30 only when instruction executing unit 30 generates an execution result of the second instruction.

Within device for implementing resource index replacement according to some embodiments of the present disclosure (e.g., device 10), resource allocating unit 50 allocates a first type resource index to an instruction when the instruction enters instruction scheduling unit 20 and replaces the first type resource index with a second type resource index when the instruction is issued by instruction scheduling unit 20 to instruction executing unit 30, and result storing unit 40 stores execution results according to the second type resource index from the instruction executing unit 30. The present disclosure can prevent overly early allocation of the second type resource index when the instruction enters instruction scheduling unit 20, thereby reducing the demand for resource quantities in result storing unit 40 and improving the resource utilization efficiency.

Embodiments of the present disclosure further provide a processor for implementing resource index replacement. It is appreciated that the processor can comprise the device for implementing resource index replacement described above (e.g., device 10).

For example, an instruction executed by the processor comprises any number of target operands and source operands. FIG. 2 is a schematic diagram of an exemplary instruction composition and resource index, according to some embodiments of the present disclosure. According to FIG. 2 with reference to FIG. 1, instruction 92 comprises one target operand index 61 and one source operand index 62, both of which are a general-purpose register index. The source operand is a target operand of another instruction 91. Therefore, instruction 91 corresponds to instruction 92 or is referred to as a producer instruction of instruction 92.

When an instruction enters instruction scheduling unit 20, resource allocating unit 50 of the processor renames the target operand as a physical register tag 71. The tag is the first type resource index and does not correspond to a physical register of result storing unit 40 (e.g., resources 41 of result storing unit 40 shown in FIG. 1).

In some embodiments, resource allocating unit 50 also renames the source operand as a physical register tag of the target operand of the producer instruction or a physical register index. The latter is the second type resource index and corresponds to a physical register of result storing unit 40.

In some embodiments, when the physical register tag of the target operand of instruction 91 is replaced by a physical register index, physical register tag 72 of the source operand corresponding to instruction 92 is simultaneously replaced by a corresponding physical register index 82.

In some embodiments, when instruction executing unit 30 generates an execution result of instruction 91, instruction 92 can be issued from instruction scheduling unit 20 to instruction executing unit 30. When instruction 92 is issued from instruction scheduling unit 20 to instruction executing unit 30, instruction 92's physical register tag 71 is replaced by physical register index 82. Meanwhile, instruction scheduling unit 20 obtains the execution result from instruction 91 according to physical register tag 72 of the source operand or physical register index 82, and issues the execution result from instruction 91 as the source operand of instruction 92 to instruction executing unit 30.

Instruction executing unit 30 executes instruction 92 and then issues an execution result of instruction 92 and physical register index 81 to result storing unit 40. Result storing unit 40 stores the execution result of instruction 92 in a physical register indicated by physical register index 81.

Figure 3:
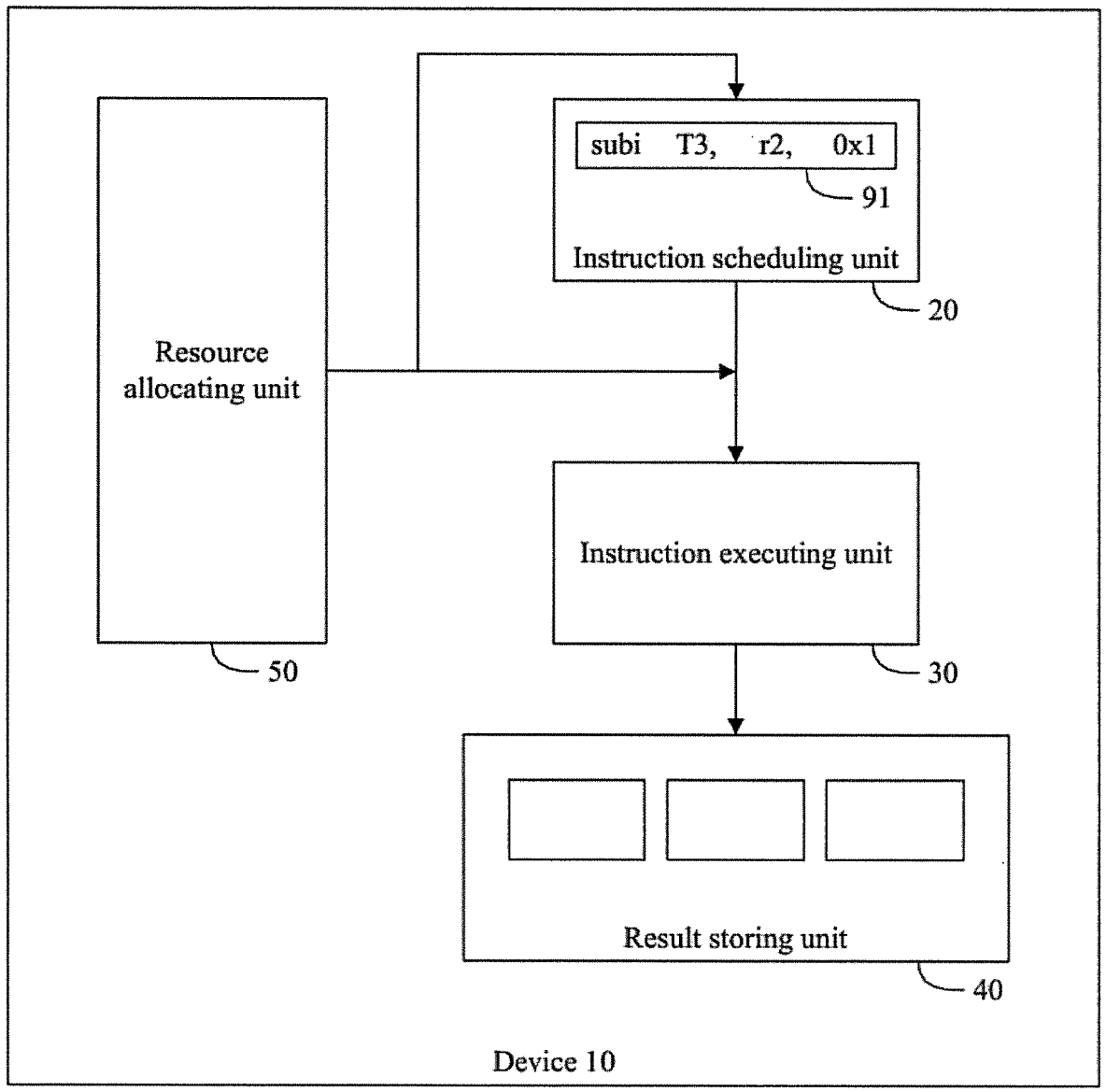
FIG. 3 is a schematic diagram of an exemplary device for implementing resource index replacement after receiving a first instruction, according to some embodiments of the present disclosure.

For example, to describe the resource index replacement process in FIG. 1, a specific implementation is used to describe the process. Assuming that the processor executes the following instruction stream:

| 91 | subi r1, r2, 0x1 |
| 92 | addi r3, r1, 0x4 |
| ... | | the execution of instructions 91 and 92 may be broken down into four steps, namely Step I, Step II, Step III and Step IV. In Step I, the device receives instruction 91. In Step II, the device receives instruction 92. In Step III, the device executes instruction 91. In Step IV, the device executes instruction 92. FIG. 3 is a schematic diagram of an exemplary device for implementing resource index replacement after receiving a first instruction, according to some embodiments of the present disclosure. As shown in FIG. 3, when instruction 91 enters instruction scheduling unit 20, the target register index is the general-purpose register r1, and the source operand index is the general-purpose register r2. Resource allocating unit 50 allocates a physical register tag T3 to replace r1.

Figure 4:
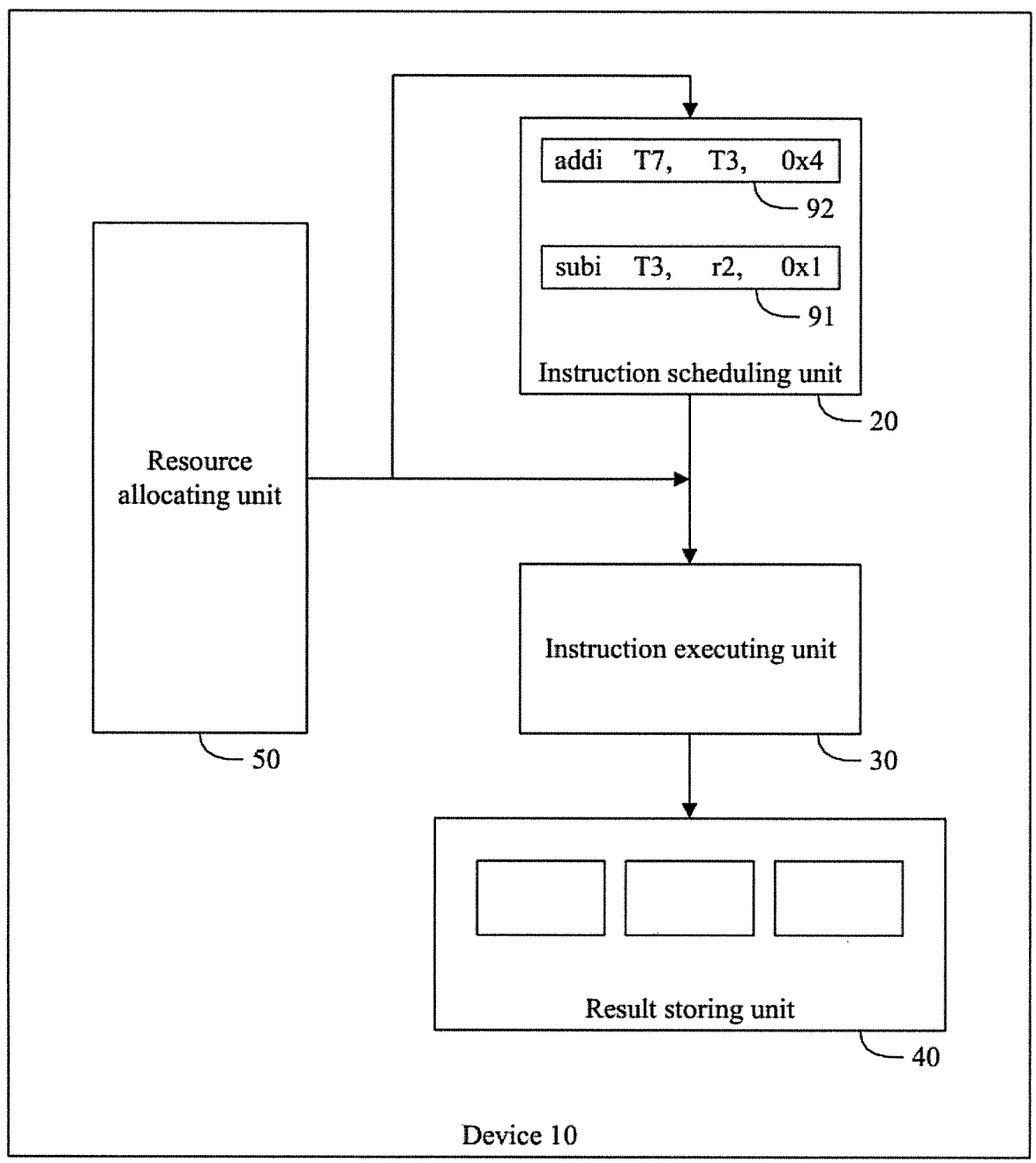
FIG. 4 is a schematic diagram of an exemplary device for implementing resource index replacement after receiving a second instruction, according to some embodiments of the present disclosure.

FIG. 4 is a schematic diagram of an exemplary device for implementing resource index replacement after receiving a second instruction, according to some embodiments of the present disclosure. As shown in FIG. 4, instruction 92 enters instruction scheduling unit 20, the target register index is general-purpose register r3, and the source operand index is general-purpose register r1. The source operand is the same as the target operand of instruction 91, and therefore, instruction 91 is a producer instruction of instruction 92. Similarly, resource allocating unit 50 allocates a new physical register tag T7 to replace r3 while source operand index r1 of instruction 92 is replaced by physical register tag T3, which also represents the target operand of instruction 91.

Figure 5:
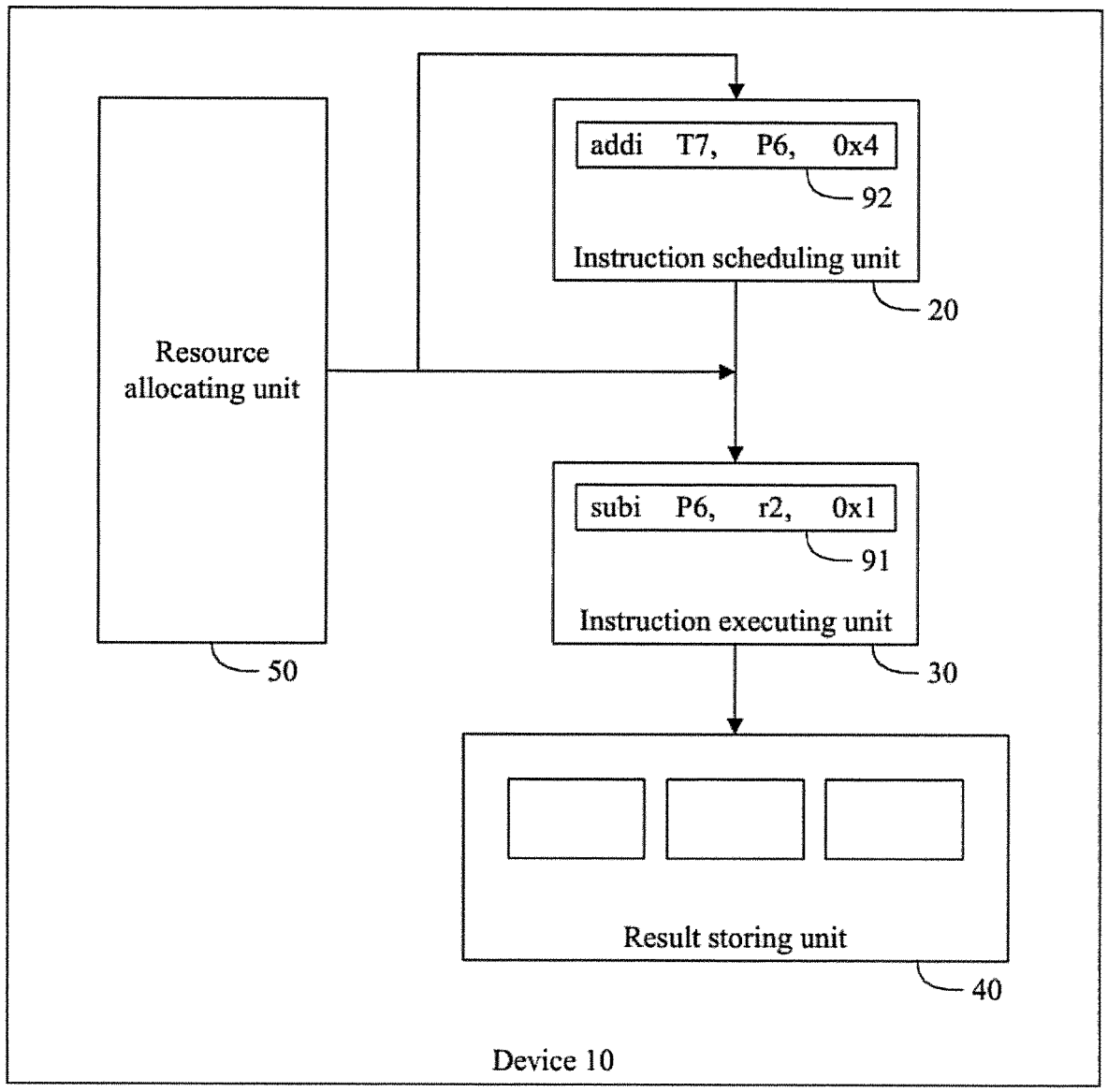
FIG. 5 is a schematic diagram of an exemplary device for implementing resource index replacement after executing a first instruction, according to some embodiments of the present disclosure.

FIG. 5 is a schematic diagram of an exemplary device for implementing resource index replacement after executing a first instruction, according to some embodiments of the present disclosure. As shown in FIG. 5, when instruction 91 is issued from instruction scheduling unit 20 to instruction executing unit 30, resource allocating unit 50 replaces physical register tag T3 with a physical register index P6. Physical register index P6 corresponds to a specific physical register in result storing unit 40, namely physical register No. 6. At this moment, source operand index T3 of instruction 92 is also replaced by physical register index P6.

Figure 6:
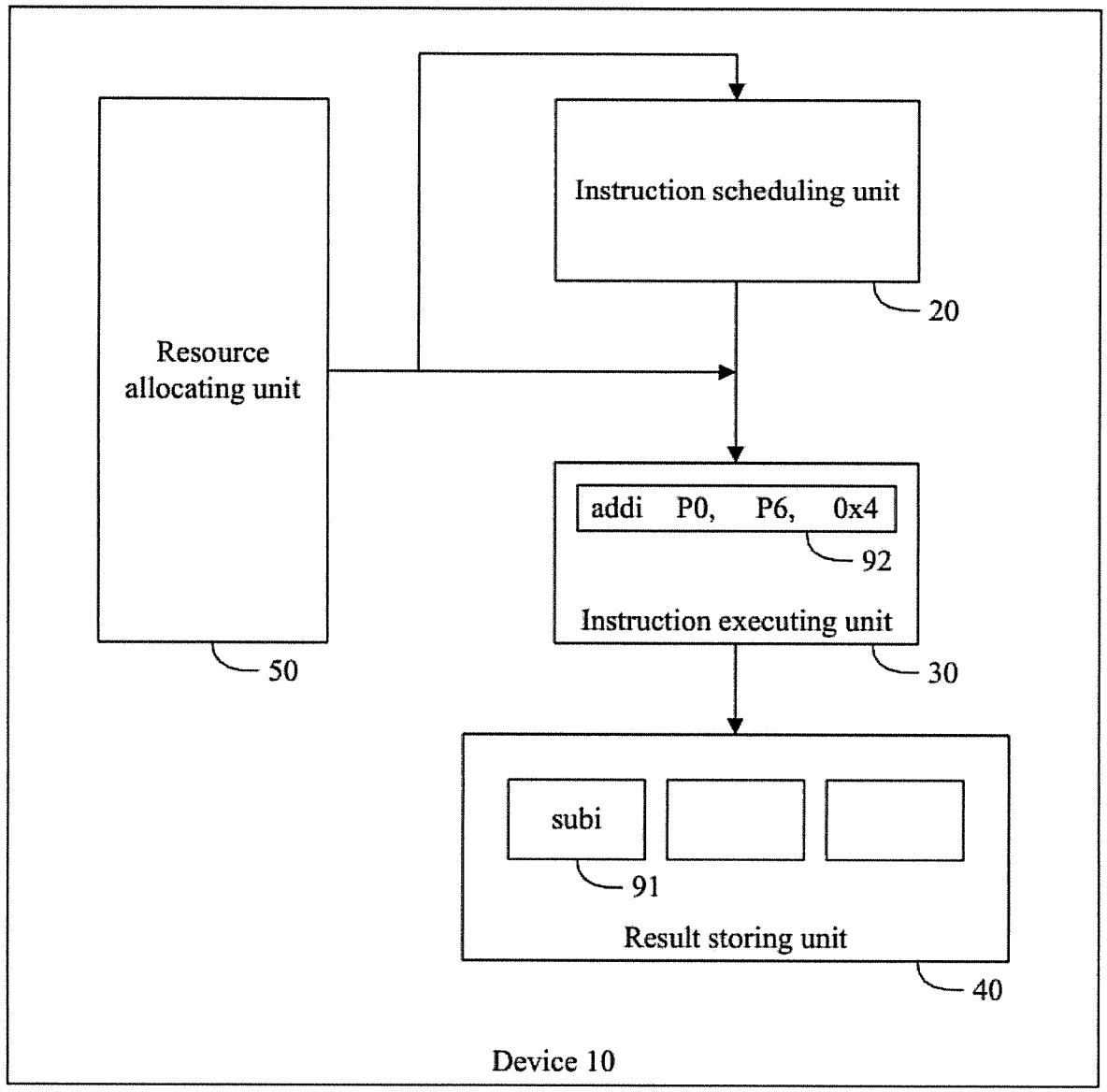
FIG. 6 is a schematic diagram of an exemplary device for implementing resource index replacement after executing a second instruction, according to some embodiments of the present disclosure.

FIG. 6 is a schematic diagram of an exemplary device for implementing resource index replacement after executing a second instruction, according to some embodiments of the present disclosure. As shown in FIG. 6, after completing the execution of instruction 91, instruction executing unit 30 issues an execution result and physical register index P6 to result storing unit 40. Result storing unit 40 stores the execution result to the physical register No. 6. At this moment, instruction 92 can be issued from instruction scheduling unit 20 to instruction executing unit 30.

At the time of transmission, instruction scheduling unit can obtain the execution result of instruction 91 via physical register index P6 and issues the execution result as a source operand of instruction 92 to instruction executing unit 30. While instruction 92 is issued to instruction executing unit 30, resource allocating unit 50 replaces the physical register tag T7 with a physical register index P0. Physical register index P0 corresponds to a specific physical register in result storing unit 40, namely physical register No. 0. After instruction executing unit 30 generates an execution result for instruction 92, result storing unit 40 can store the execution result to the physical register No. 0.

Embodiments of the present disclosure further provide a method for implementing resource index replacement. It is appreciated that the method can be implemented by the device (e.g., device 10) and the processor described above.

Some specific embodiments of the present disclosure are described above, and the protective scope of the present disclosure is not limited to these embodiments. Any variation or substitution that can be easily conceived of by those skilled in the art within the technical scope disclosed by the present disclosure should fall within the protective scope of the present disclosure. Therefore, the protective scope of the present disclosure should be subject to the protective scope of the claims.

The invention claimed is:

1. A method for executing instructions, comprising:
   receiving a first instruction including a first general-purpose register identifier;
   scheduling the first instruction for execution by:
      sending the first instruction to a scheduling unit; and
      replacing the first general-purpose register identifier with a first physical register tag when the first instruction enters the scheduling unit;
   issuing the first instruction for execution by:
      sending the first instruction to an execution unit; and
      replacing the first physical register tag with a first physical register index when the first instruction enters the execution unit, wherein the first physical register index corresponds to a first specific physical register in a result storing unit;
   executing the first instruction in the execution unit to obtain an execution result; and
   storing the execution result in the first specific physical register in the result storing unit.

2. The method of claim 1, further comprising:
   receiving a second instruction including a second general-purpose register identifier, wherein the second instruction depends on the first instruction;
   replacing the second general-purpose register identifier of the second instruction with the first physical register tag when the first general-purpose register identifier of the first instruction is replaced with the first physical register tag; and
   replacing the first physical register tag of the second instruction with the first physical register index when the first physical register tag of the first instruction is replaced with the first physical register index.

3. The method of claim 2, wherein:
   the first instruction comprises at least one of a first source operand index or a first target operand index; and
   the second instruction comprises at least one of a second source operand index or a second target operand index.

4. The method of claim 3, further comprising:
   replacing the second source operand index of the second instruction with the first physical register tag when the first general-purpose register identifier of the first instruction is replaced with the first physical register tag.

5. The method of claim 3, wherein the second source operand index of the second instruction corresponds to the first target operand index of the first instruction.

6. The method of claim 5, further comprising:
   issuing the second instruction for execution after the execution result of the first instruction has been obtained.

7. A device, comprising:
   a result storing unit including a plurality of specific physical registers;
   an instruction scheduling unit including circuitry configured to:
      receive a first instruction including a first general-purpose register identifier; and
      replace the first general-purpose register identifier with a first physical register tag when the first instruction enters the instruction scheduling unit;
   an instruction execution unit including circuitry configured to:
      receive the first instruction from the instruction scheduling unit;
      replace the first physical register tag with a first physical register index when the first instruction enters the instruction execution unit, wherein the first physical register index corresponds to a first specific physical register in the result storing unit; and
      execute the first instruction to obtain an execution result;
   the result storing unit is configured to store the execution result in the first specific physical register.

8. The device of claim 7, wherein:
   the instruction scheduling unit includes circuitry configured to:
      receive a second instruction including a second general-purpose register identifier, wherein the second instruction depends on the first instruction; and replace the second general-purpose register identifier of the second instruction with the first physical register tag when the first general-purpose register identifier of the first instruction is replaced with the first physical register tag; and the instruction execution unit includes circuitry configured to:
  receive the second instruction from the instruction scheduling unit; and
  replace the first physical register tag of the second instruction with the first physical register index when the first physical register tag of the first instruction is replaced with the first physical register index.

9. The device of claim 8, wherein:
the first instruction comprises at least one of a first source operand index or a first target operand index; and
the second instruction comprises at least one of a second source operand index or a second target operand index.

10. The device of claim 9, wherein the instruction execution unit includes circuitry configured to:
  replace the second source operand index of the second instruction with the first physical register tag when the first general-purpose register identifier of the first instruction is replaced with the first physical register tag.

11. The device of claim 9, wherein the second source operand index of the second instruction corresponds to the first target operand index of the first instruction.

12. The device of claim 11, wherein the instruction scheduling unit includes circuitry configured to:
  issue the second instruction for execution after the execution result of the first instruction has been obtained.

13. A non-transitory computer readable medium that stores a set of instructions that is executable by one or more processors of an apparatus to cause the apparatus to initiate a method for executing instructions in a processor, the method comprising:
  receiving a first instruction including a first general-purpose register identifier;
  scheduling the first instruction for execution by:
    sending the first instruction to a scheduling unit; and
    replacing the first general-purpose register identifier with a first physical register tag when the first instruction enters the scheduling unit;
  issuing the first instruction for execution by:
    sending the first instruction to an execution unit; and
    replacing the first physical register tag with a first physical register index when the first instruction enters the execution unit, wherein the first physical register index corresponds to a first specific physical register in a result storing unit;
  executing the first instruction in the execution unit to obtain an execution result; and
  storing the execution result in the first specific physical register in the result storing unit.

14. The non-transitory computer readable medium of claim 13, wherein the set of instructions that is executable by one or more processors of the apparatus to cause the apparatus to further perform:
  receiving a second instruction including a second general-purpose register identifier, wherein the second instruction depends on the first instruction;
  replacing the second general-purpose register identifier of the second instruction with the first physical register tag when the first general-purpose register identifier of the first instruction is replaced with the first physical register tag; and
  replacing the first physical register tag of the second instruction with the first physical register index when the first physical register tag of the first instruction is replaced with the first physical register index.

15. The non-transitory computer readable medium of claim 14, wherein:
  the first instruction comprises at least one of a first source operand index or a first target operand index; and
  the second instruction comprises at least one of a second source operand index or a second target operand index.

16. The non-transitory computer readable medium of claim 15, wherein the set of instructions that is executable by one or more processors of the apparatus to cause the apparatus to further perform:
  replacing the second source operand index of the second instruction with the first physical register tag when the first general-purpose register identifier of the first instruction is replaced with the first physical register tag.

17. The non-transitory computer readable medium of claim 15, wherein the second source operand index of the second instruction corresponds to the first target operand index of the first instruction.

18. The non-transitory computer readable medium of claim 17, wherein the set of instructions that is executable by one or more processors of the apparatus to cause the apparatus to further perform:
  issuing the second instruction for execution after the execution result of the first instruction has been obtained.

* * * * *